(12) United States Patent  (10) Patent No.: US 7,737,996 B2
Gerhard et al.  (45) Date of Patent: Jun. 15, 2010

(54) TECHNIQUES FOR AUTOMATED ANIMATION

(75) Inventors: Lutz Gerhard, Seattle, WA (US);
Matthew J. Kotler, Kenmore, WA (US);
Stephen T. Wells, Seatttle, WA (US);
Thomas C. Underhill, Seattle, WA (US); Alexandre Gueniot, Bouillargues (FR)

(73) Assignee: Microsoft Corporation, Redmond, WA (US)

( * ) Notice: Subject to any disclaimer, the term of this patent is extended or adjusted under 35 U.S.C. 154(b) by 87 days.

(21) Appl. No.: 11/291,265

(22) Filed: Dec. 1, 2005

(65) Prior Publication Data

US 2007/0126741 A1  Jun. 7, 2007

(51) Int. Cl.
G09G 5/00 (2006.01)
G06T 1/00 (2006.01)
G06T 13/00 (2006.01)
(52) U.S. Cl. .................. 345/619; 345/418; 345/473; 715/730; 715/732
(58) Field of Classification Search .................. None
See application file for complete search history.

(56) References Cited

U.S. PATENT DOCUMENTS

| | | | |
|---|---|---|---|
| 5,867,175 A | 2/1999 | Katzenberger et al. | |
| 6,072,480 A * | 6/2000 | Gorbet et al. | 715/730 |
| 6,222,537 B1 | 4/2001 | Smith et al. | |
| 6,377,276 B1 | 4/2002 | Ludtke | |
| 6,396,500 B1 * | 5/2002 | Qureshi et al. | 345/473 |
| 6,720,979 B1 | 4/2004 | Shrader | |

(Continued)

FOREIGN PATENT DOCUMENTS

WO  WO2005076618  8/2005

OTHER PUBLICATIONS

Macromedia, Inc.,"Macromedia - Flash Profession 8: Features", Sep. 2005, available at http://web.archive.org/web/20050923161100/http://macromedia.com/software/flash/flashpro/productinfo/features/.

(Continued)

*Primary Examiner*—Daniel F Hajnik

(57) ABSTRACT

Techniques are provided for forming one or more animation sequences used in animating a graphic. A semantic model of one or more semantic elements corresponding to content data is received. A presentation model of one or more presentation elements corresponding to objects is received. A set of one or more mappings is determined. The set of one or more mappings includes a mapping of each of said semantic elements to one or more presentation elements. The set of one or more mappings are traversed in an ordering in accordance with a selected animation sequence type specifying a set of objects that animate together. One or more animation sequences are built when performing the traversing step using each of the one or more mappings by applying one or more rules in accordance with a particular classification associated with each of the one or more mappings.

20 Claims, 12 Drawing Sheets

U.S. PATENT DOCUMENTS

| | | | |
|---|---|---|---|
| 6,904,561 | B1 | 6/2005 | Faraday et al. |
| 7,428,704 | B2* | 9/2008 | Baker et al. ................. 715/730 |
| 2002/0147740 | A1* | 10/2002 | Faraday et al. .............. 707/500 |
| 2002/0191013 | A1* | 12/2002 | Abrams ...................... 345/730 |
| 2004/0189645 | A1 | 9/2004 | Beda et al. |
| 2005/0091573 | A1 | 4/2005 | Faraday et al. |
| 2005/0140694 | A1 | 6/2005 | Subramanian et al. |
| 2005/0289466 | A1* | 12/2005 | Chen .......................... 715/731 |
| 2006/0265659 | A1* | 11/2006 | Collins et al. ............... 715/732 |

OTHER PUBLICATIONS

Roisin et al., "Editing SMIL with Timelines", SMILEurope2003, Feb. 2003, available at http://wam.inrialpes.fr/publications/2003/smileurope_editingtimelines/EditingSMIL.html.

Neff et al., "Aesthetic Edits for Character Animation", Proceedings of the 2003 ACM SIGGRAPH/Eurographics Symposium on Computer Animation, Jul. 2003 available at http://www.dgp.toronto.edu/papers/mneff_SCA2003.pdf.

* cited by examiner

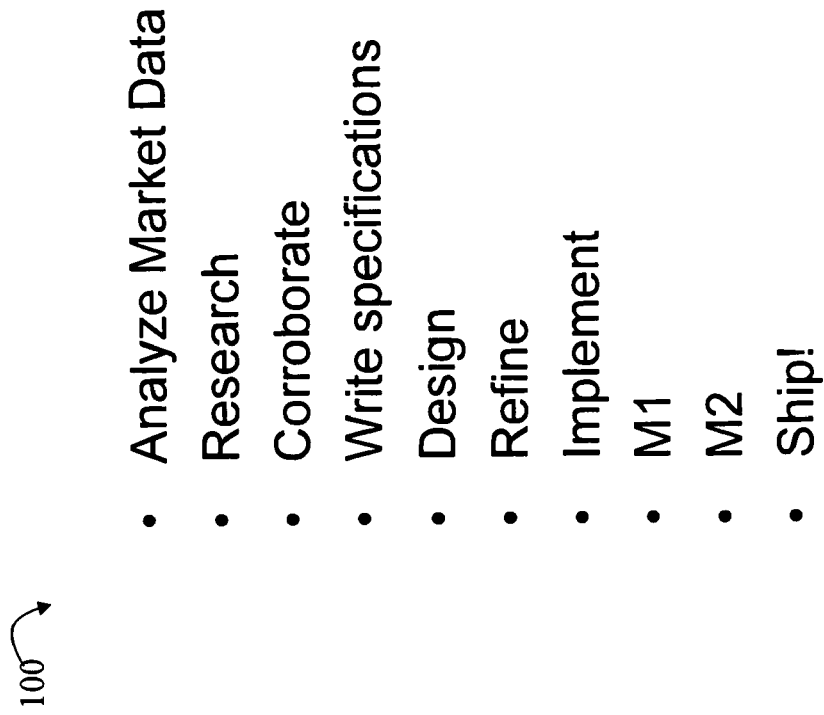

TECHNIQUES FOR AUTOMATED ANIMATION

CROSS-REFERENCE TO RELATED APPLICATIONS

This patent application is related to U.S. patent application No. Ser. 10/955,271, entitled METHOD, SYSTEM, AND COMPUTER-READABLE MEDIUM FOR CREATING AND LAYING OUT A GRAPHIC WITHIN AN APPLICATION PROGRAM, filed on Sep. 30, 2004 and assigned to the same assignee as this application. The aforementioned patent application is expressly incorporated herein by reference.

BACKGROUND

Existing application programs operating on documents may provide functionality for animation of diagrams included in the documents. Animation may be characterized as adding a special visual or sound effect to elements in a diagram. For example, an application program may be used in producing slides for a presentation. The presenter may utilize animation when creating diagrams included in the presentation to affect the manner in which the elements included in the diagrams are displayed. Existing applications may allow animation of individual elements, such as objects or shapes, in a diagram. In order to have a same set of animations apply to multiple elements, a user may have to manually specify the animations for each element in a diagram. In the event the user modifies an element included in, or adds an element to, an animated diagram, the user may be required to re-specify the animations for the new or modified element. Additionally, in the event a user switches diagrams, the user may have to respecify any animations for application to individual elements in the new diagram.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are techniques for forming one or more animation sequences used in animating a graphic. The techniques may use a semantic model and a presentation model. A semantic model may be characterized as a structured representation of content data. A presentation model may include objects or shapes of a diagram as presented for viewing or display. In accordance with one aspect of the techniques described herein, a semantic model of one or more semantic elements corresponding to content data is received. A presentation model of one or more presentation elements corresponding to objects is received. A set of one or more mappings is determined. The set of one or more mappings includes a mapping of each of said semantic elements to one or more presentation elements. The set of one or more mappings are traversed in an ordering in accordance with a selected animation sequence type specifying a set of shapes or objects that animate together. One or more animation sequences are built when performing the traversing step using each of the one or more mappings by applying one or more rules in accordance with a particular classification associated with each of the one or more mappings.

DESCRIPTION OF THE DRAWINGS

Features and advantages of the present invention will become more apparent from the following detailed description of exemplary embodiments thereof taken in conjunction with the accompanying drawings in which:

FIG. 5 is an example of a bulleted list;

DETAILED DESCRIPTION

Figure 1:
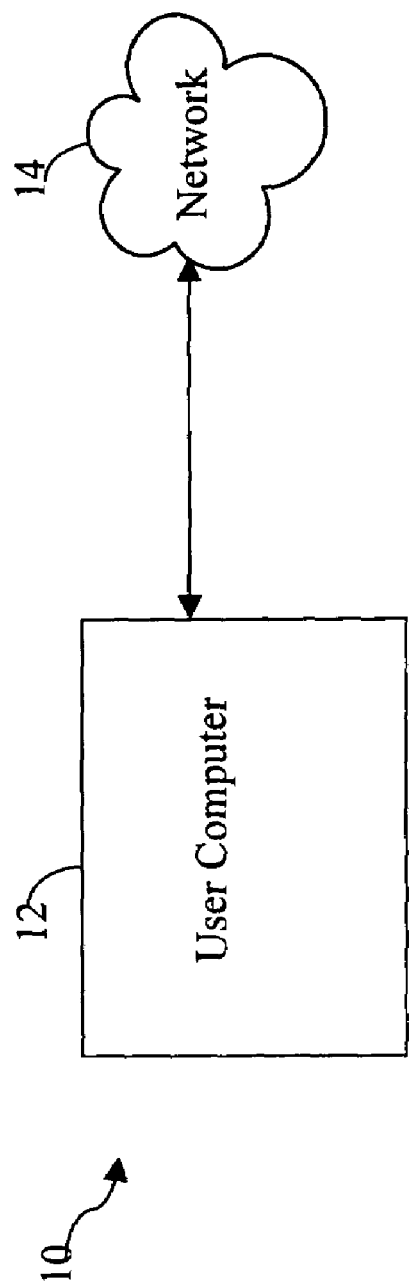
FIG. 1 is an example of an embodiment illustrating an environment that may be utilized in connection with the techniques described herein.

Referring now to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1 is a user computer 12 and a network 14. The user computer 12 may include a standard, commercially-available computer or a special-purpose computer that may be used to execute one or more program modules. Described in more detail elsewhere herein are program modules that may be executed by the user computer 12 in connection with facilitating the application of animation build steps for use with different diagrams. The user computer 12 may operate in a networked environment and communicate with other computers not shown in FIG. 1.

It will be appreciated by those skilled in the art that although the user computer is shown in the example as communicating in a networked environment, the user computer 12 may communicate with other components utilizing different communication mediums. For example, the user computer 12 may communicate with one or more components utilizing a network connection, and/or other type of link known in the art including, but not limited to, the Internet, an intranet, or other wireless and/or hardwired connection(s).

Figure 2:
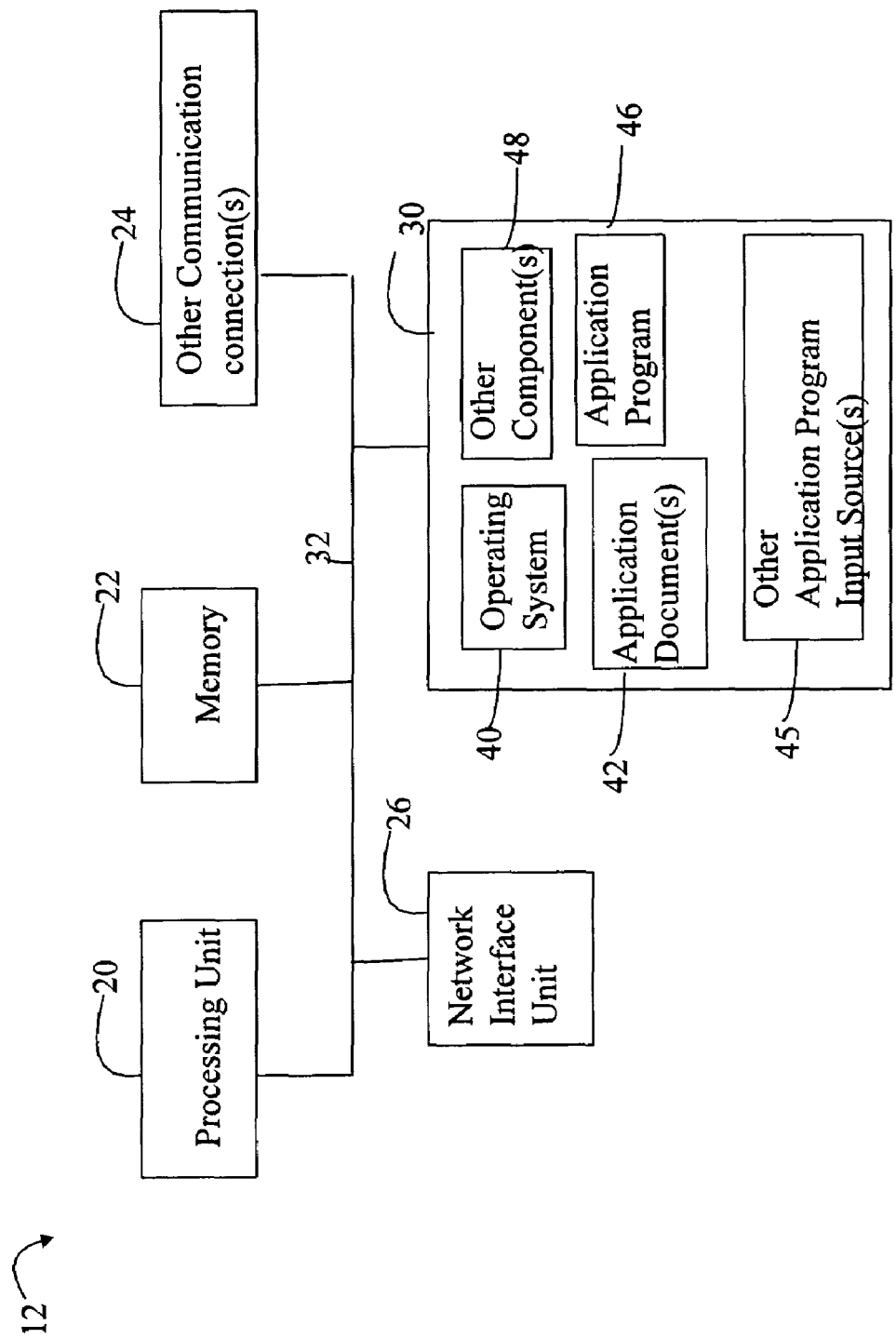
FIG. 2 is an example of components that may be included in an embodiment of a user computer for use in connection with performing the techniques described herein.

Referring now to FIG. 2, shown is an example of components that may be included in a user computer 12 as may be used in connection with performing the various embodiments of the techniques described herein. The user computer 12 may include one or more processing units 20, memory 22, a network interface unit 26, storage 30, one or more other communication connections 24, and a system bus 32 used to facilitate communications between the components of the computer 12.

Depending on the configuration and type of user computer 12, memory 22 may be volatile (such as RAM), non-volatile (such as ROM, flash memory, etc.) or some combination of the two. Additionally, the user computer 12 may also have additional features/functionality. For example, the user computer 12 may also include additional storage (removable and/or non-removable) including, but not limited to, USB devices, magnetic or optical disks, or tape. Such additional storage is illustrated in FIG. 2 by storage 30. The storage 30 of FIG. 2 may include one or more removable and non-removable storage devices having associated computer-readable media that may be utilized by the user computer 12. The storage 30 in one embodiment may be a mass-storage device with associated computer-readable media providing non-volatile storage for the user computer 12. Although the description of computer-readable media as illustrated in this example may refer to a mass storage device, such as a hard disk or CD-ROM drive, it will be appreciated by those skilled in the art that the computer-readable media can be any available media that can be accessed by the user computer 12.

By way of example, and not limitation, computer readable media may comprise computer storage media and communication media. Memory 22, as well as storage 30, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by user computer 12. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The user computer 12 may also contain communications connection(s) 24 that allow the user computer to communicate with other devices and components such as, by way of example, input devices and output devices. Input devices may include, for example, a keyboard, mouse, pen, voice input device, touch input device, etc. Output device(s) may include, for example, a display, speakers, printer, and the like. These and other devices are well known in the art and need not be discussed at length here. The one or more communications connection(s) 24 are an example of communication media.

In one embodiment, the user computer 12 may operate in a networked environment as illustrated in FIG. 1 using logical connections to remote computers through a network. The user computer 12 may connect to the network 14 of FIG. 1 through a network interface unit 26 connected to bus 32. The network interface unit 26 may also be utilized in connection with other types of networks and/or remote systems and components.

One or more program modules and/or data files may be included in storage 30. During operation of the user computer 12, one or more of these elements included in the storage 30 may also reside in a portion of memory 22, such as, for example, RAM for controlling the operation of the user computer 12. The example of FIG. 2 illustrates various components including an operating system 40, one or more application programs 46, one or more application documents 42, other application program input sources 45, and other components 48. The operating system 40 may be any one of a variety of commercially available or proprietary operating system. The operating system 40, for example, may be loaded into memory in connection with controlling operation of the user computer. One or more application programs 46 may execute in the user computer 12 in connection with performing user tasks and operations.

Application documents 42 may be used with particular application programs 46. In one example, an application program may be a program, such as Microsoft PowerPoint™ for creating and accessing presentations. The application program may include functionality for animating all, or specified portions of, a presentation. What will be described in following paragraphs are techniques that may be used in connection with animating a presentation or diagram included in the application document which, in the example, is a presentation. It should be noted that although Microsoft PowerPoint™ is referenced as an example to illustrate the techniques described herein, other application programs, such as, for example, Macromedia Flash, Apple Keynote™, and the like, providing animation in connection with their respective application documents may also utilize the techniques. An application program may also utilize other input sources 45 in connection with an embodiment. An embodiment may also include other components 48 than as specifically set forth herein.

The techniques described in following paragraphs may be utilized in connection with animation. Animation may be characterized as adding a special effect such as, for example, a visual or sound effect, to elements in a diagram. As an example, an application program may be used in producing slides for a presentation. The presenter may utilize animation when creating diagrams included in the presentation to affect the manner in which the elements included in the diagrams are displayed. As used herein, an animation sequence may be characterized as a set of shapes or objects which are animated together by applying a selected effect. Specifying, for example, "by level at once" as an animation sequence selection type means that all objects and associated transitions or connectors on a single level animate together as one animation sequence. Content data may be characterized as raw data such as, for example, a list of words to be displayed in accordance with a selected layout or diagram. The diagram may include one or more shapes or objects which are populated with the content data in a specified manner by applying animations. These, and other elements, are described in more detail elsewhere herein and also in MS Ref# 309693.1, U.S. patent application Ser. No. 10/955,271, entitled METHOD, SYSTEM, AND COMPUTER-READABLE MEDIUM FOR CREATING AND LAYING OUT A GRAPHIC WITHIN AN APPLICATION PROGRAM, filed on Sep. 30, 2004, which is incorporated herein by reference. For a set of content data and a selected layout, a set of mappings are automatically generated using the techniques described in following paragraphs. By selecting a type of animation sequence (e.g., "by level at once"), the set of mappings are traversed in a particular order. Processing templates, including a set of rules as defined for each of different types of mappings, are then applied for each of the mappings to achieve the desired animation sequence. The techniques described herein may be used to automate animation of a presentation as opposed to, for example, manually specifying a set of animation build steps for one object and then manually applying the steps to other objects in the presentation. Using the techniques described herein, if an object is added to a diagram, additional mappings are automatically generated for the new object and appropriate processing templates applied. If a new animation sequence is selected, the current set of mappings are traversed in another order in accordance with the new animation sequence, and the appropriate processing templates applied in accordance with the new ordering. If a different layout is selected, the techniques described herein provide for maintaining the context of the currently selected animation and content data by automatically generating a set of mappings for the current content data and the different layout, traversing the mappings in an order in accordance with the currently selected animation, and then applying appropriate processing templates for the mappings in the order. Customizations may also be made to the foregoing animations. The foregoing will now be described in more detail.

Figure 3:
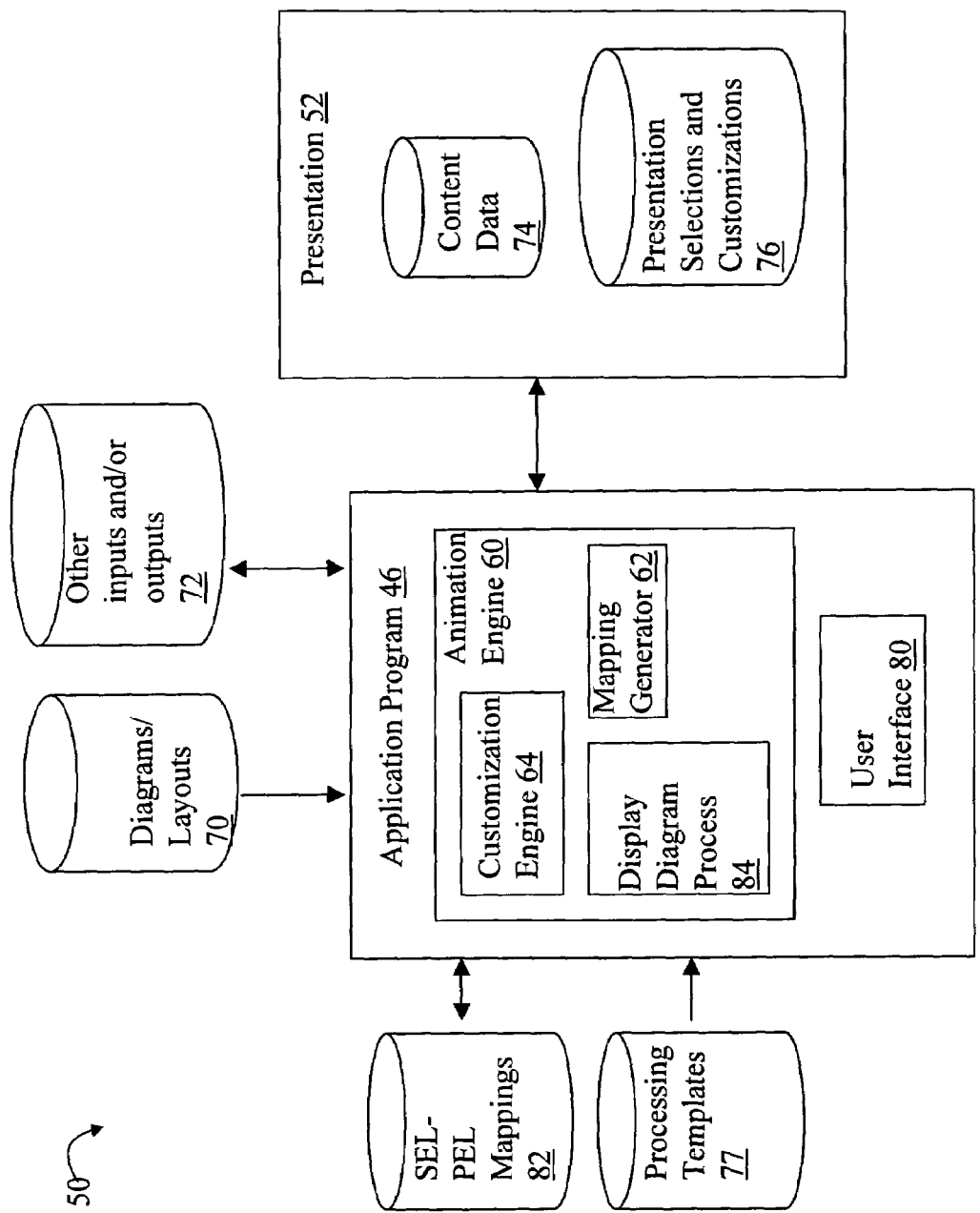
FIG. 3 is an example illustrating in more detail components from FIG. 2 that may be included in an embodiment utilizing the techniques described herein.

Referring now to FIG. 3, shown is an example 50 illustrating in more detail components that may be included in an embodiment utilizing the techniques described herein. The application program 46 may include an animation engine 60 and a user interface 80. The animation engine 60 may include a customization engine 64, a display diagram process 84, and a mapping generator 62. The presentation 52 may be one type of application document accessed by an application program 46, such as Microsoft PowerPoint™. The presentation 52 may include content data 74 and presentation selections and customizations 76. It should be noted that the presentation 52, as well as other components described herein, may also include additional elements than as described herein which have been omitted for the sake of simplicity for illustrating the techniques described.

During operation, the application program 46 may display one or more menu options, for example, in the form of a graphical user interface. These one or more menu options may be displayed by the user interface component 80 in order to obtain one or more user selections and other input/output as described in following paragraphs. The application program may accept input data from the diagrams/layouts component 70 as well as data from other inputs and/or outputs 72. For example, the application program may receive as input one or more user selections as represented by component 72. The component 70 may represent a collection of diagrams or layouts from which a user may make a selection to specify a particular diagram for use in connection with the techniques described herein. The application program 46 also inputs and outputs SEL-PEL (semantic element(SEL)-to-presentation element(PEL)) mappings 82, and inputs processing templates 77 in connection with animation of a selected diagram as described in more detail in following paragraphs. It should be noted that the components 70, 77 and 82 may be stored in memory and/or on another form of storage as described herein.

In connection with creating a presentation 52, a user may input content data 74 to be displayed in accordance with a selected layout or diagram. The content data may initially be entered via a user interface and subsequently stored in a presentation as a document file. The layout or diagram may include one or more objects such as, for example, different graphical shapes. The content data 74 may be characterized as raw data to be displayed in the selected diagram. The particular diagram selected may be specified, for example, by obtaining inputs from a user. For example, in one embodiment, a list of one or more diagrams may be displayed to the user. Subsequently, the user may make a selection using a mouse or other input device. The one or more diagrams may be obtained from the diagram/layout components 70. The particular diagram selected may be included in the presentation 52, as illustrated by component 76. It should be noted that the presentation selections and customizations component 76 may collectively represent the result of a user's one or more presentation selections. For example, the selection of a diagram results in incorporation of the diagram into the presentation 52. As another example, an embodiment may provide functionality for customizing the animations as described herein. The customizations may also be represented by the component 76.

In one embodiment, a diagram may utilize a semantic model and a presentation model. The semantic model may be represented to a user, for example, as a list of bulleted items that may be input through a user interface. The bulleted list may be characterized as representing a semantic model which is structured, hierarchical, and linear. The presentation model may be presented to the user, for example, as the objects or shapes of a diagram when viewed on a display device. In connection with utilizing the techniques described herein with animation, one or more mappings are generated in which semantic elements of the semantic model are mapped to presentation elements of the presentation model. In one embodiment, a semantic element may correspond to a single bulleted item from the bulleted list described above. Presentation elements may correspond to objects in the selected diagram. Which semantic elements are mapped to which presentation elements are represented by the SEL-PEL mappings 82. The mappings included in 82 are used in connection with animation of the selected diagram.

It should be noted that an embodiment may also provide functionality so that a user may access the semantic model and input data in various ways that will be appreciated by those skilled in the art. For example, a user may also access the semantic model and elements directly when displayed in a representation form of the presentation model.

The processing templates 77 include one or more predetermined rules or processing instructions for each type of SEL-PEL mapping. In one embodiment, as will be described in following paragraphs, there are four types of SEL-PEL mappings. The templates 77 include a fixed set of rules to be performed for each of these types of mappings when generating an animation sequence. In an embodiment, these rules may or may not be modified by a user. For example, an embodiment may include functionality allowing a user to reverse the ordering of the rules. Other embodiments may include other options for different orderings affecting the order of the corresponding rules.

In operation, the application program 46 obtains content data 74 and a selected diagram from the collection of diagrams/layouts 70. The mapping generator 62 of the application program 46 then generates SEL-PEL mappings 82 for use in connection with any selected animation sequence. In connection with a selected kind of animation sequence, the mappings are traversed in a particular order. Each mapping has an associated type or classification, as described below in more detail. Rules from the templates 77 corresponding to the type or classification of each mapping are applied in accordance with the traversal ordering to produce animation sequences.

An embodiment may utilize one or more predefined animation sequence types. In one embodiment, for example, the following animation sequence kinds or types may be defined: as one object, all at once, by-level at once, by-level one by one, in order, and the reverse of the last 3 of the foregoing. As described herein, an animation sequence refers to the set of objects that animate together in a presentation. As one object may be characterized as treating the entire diagram as a single image when performing operations such as animations. As an example, if a diagram includes multiple circles in an arrangement and an animation is applied causing the circles to rotate in a particular direction, with as one object, all the circles rotate as one image in the circular direction. All at once refers to displaying all objects of the diagram at once in a single animation sequence. All at once treats the different objects or shapes of a diagram as individual elements in which the same animation sequence is applied to all of the elements individually and at the same time. As an example, consider the previously described case with multiple circles in a diagram. With all at once, each of the circles are treated as individual elements to which a circular or rotational animation may be applied causing each individual circle to rotate in the specified direction. By-level at once refers to creating an animation sequence for all semantic elements at a single hierarchical level and displaying these semantic elements from the single level all at once. By-level one by one refers to creating an animation sequence for each semantic element on a level-by-level progression, and displaying each semantic element one at a time progressing through each level in a designated hierarchy associated with the content data. In order refers to creating an animation sequence for each semantic element in the order in which the elements appear in the semantic model, such as the bulleted list. An embodiment may also include the reverse of each of the foregoing providing a total of eight predefined animation sequence types. A user may select one of the foregoing animation sequence types to be applied in connection with a set of content data and a diagram, as will be described in more detail elsewhere herein. Additionally, customization to the animation sequences may be made using the customization engine 64.

It should be noted that an embodiment may include reverse ordering as a general option which may or may not apply to certain specified orderings. An embodiment may similarly include other general options which may apply to certain orderings. Such other general options may include, for example, others relating to the order of animation, as well as timing options (e.g., wait for a click between animation of two shapes).

The display diagram process 84 presents the diagrams of the presentation in accordance with the animations and any customizations. In other words, the process 84 represents the process which controls the output of the objects in the diagrams when viewing a presentation. The process 84, for example, controls the animation of a presentation such as, for example, when objects and content data are displayed on an output device (e.g., in response to a mouse click), how the objects and content data are presented (e.g., bold, other animation effects such as sound), and the like. The process 84, for example, determines the appropriate traversal order of the mappings for the selected animation sequence type, determines the type of each of the mappings, applies the appropriate processing template for each of the mapping types, and applies any animation customizations.

It should be noted that different types of customizations that may be made in connection with animation of a presentation are known to those skilled in the art. Customizations may include, for example, modifying an animation sequence to incorporate a special effect such as causing text or objects to be displayed using an entrance effect "flying in" from the left or right hand side, or having a particular sound effect play when an object is initially displayed. Custom animations can be applied to items on a slide, or to a paragraph (which includes single bullets or list items). For example, fly-in animation effects can be applied to all items on a slide or to a single paragraph in a bulleted list. More than one animation can also be applied to a single item. For example, a bullet item can fly in and then fly out.

The presentation 52 may be stored on a storage device, such as a disk. The presentation 52 may be initially created during a first session when executing the application program. The presentation 52 as stored on the storage device may include the content data, selected diagram, and any customizations, as well as other data. The presentation 52 may be accessed when subsequently executing the application program. In one embodiment, the mappings 82 may be generated each time a presentation 52 is accessed and stored in memory once generated until the presentation 52 is closed. Alternatively, an embodiment may choose to store the mappings 82 as part of the presentation.

Figure 4:
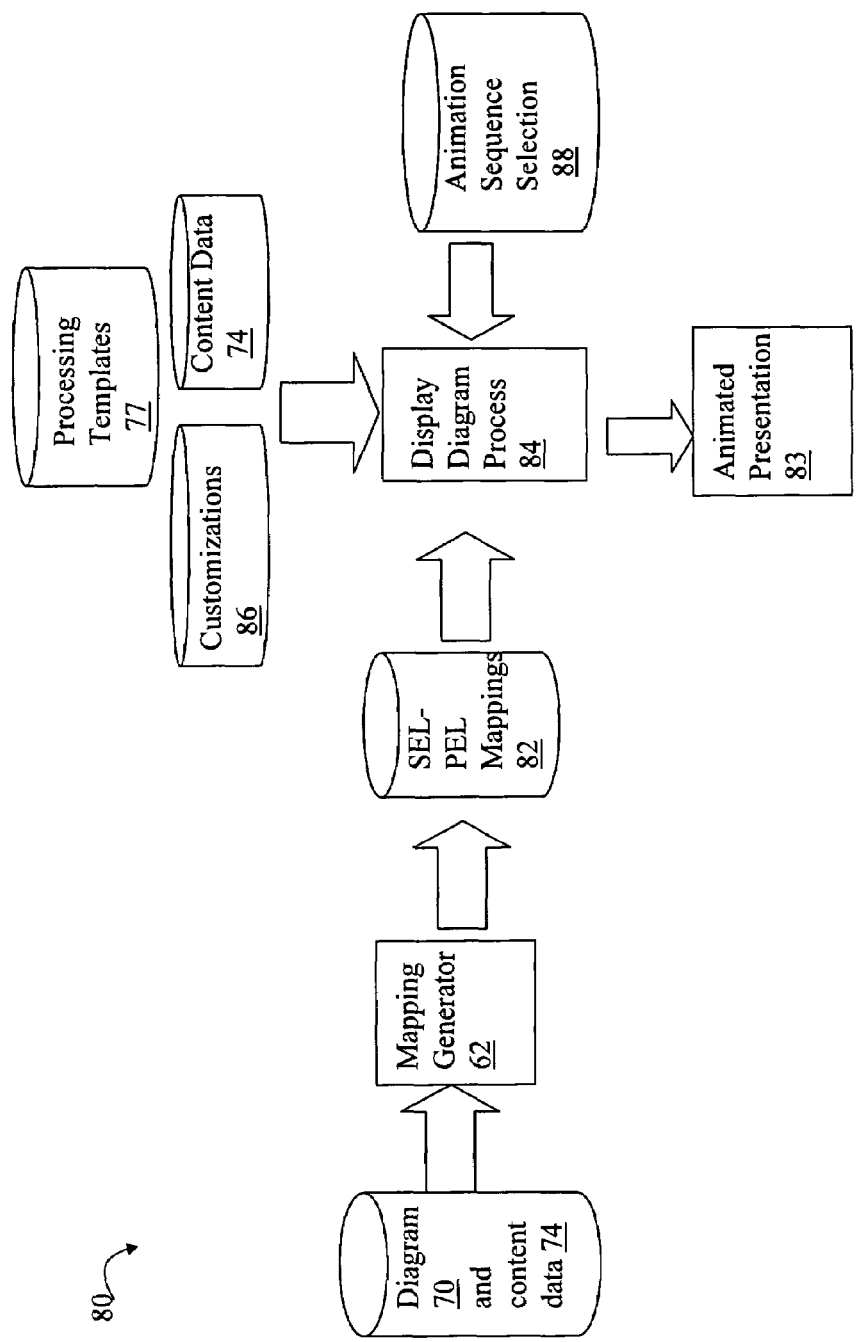
FIG. 4 is an example of a block diagram illustrating the flow and interaction between some of the components presented in FIG. 3.

Referring now to FIG. 4, shown is a block diagram illustrating the flow and interaction between some of the components described in connection with FIG. 3. In the illustration 80, a user may input content data 74 and may select a particular diagram from the collection of diagrams represented by component 70. The selected diagram and content data are input to the mapping generator 62, which produces the SEL-PEL mappings 82. The display diagram process 84 takes as input the generated mappings 82, the content data 74, any customizations 86, processing templates 77, and the animation sequence selection 88 to produce as an output the animated presentation 83. It should be noted that the components 86 and 88 are collectively represented in FIG. 3 as being included in component 76 when stored with the presentation. The selection 88 represents the selection of one of the types of animation sequences as described above and elsewhere herein in more detail.

It should be noted that an embodiment may include a different number and varying kinds of animation sequences, mappings, and the like, than as described herein.

In one embodiment, there may be four classifications or types of mappings 82 for animation of a selected diagram. These four classifications characterize the different types of mapping relationships between semantic elements and presentation elements. The four classifications of mappings in one embodiment are:

1 to 1: one semantic element maps to one presentation element;

1 to many: one semantic element maps to many presentation elements;

many to 1: many semantic elements map to a single presentation element; and 0 to many: presentation elements having no corresponding semantic elements.

The mapping generator 62 determines an SEL-PEL mapping for each semantic element based on the structure of the content data. For example, based on the position of each semantic element in the semantic model, each semantic element is determined as mapping to one or more presentation elements. In one aspect, the diagram may be characterized as having placeholders within which the semantic elements are to be placed. Which semantic element is placed in which placeholder depends on the hierarchical location of the semantic element in the semantic model. The "nth" element in the bulleted list, for example, may be mapped to a placeholder associated with two presentation elements. The 1 to many mapping case applies in this instance, and an SEL-PEL mapping is accordingly created.

It should be noted that the 0 to many mapping case corresponds to, for example, background presentation elements of a diagram which do not have a corresponding semantic element. For example, no specified text is to be incorporated in a background presentation element.

It should also be noted that an embodiment may include other semantic elements with corresponding mappings such as "1 to 0" and "many to 0" in which the semantic elements may not have corresponding presentation elements. An embodiment may also limit the number of levels or items that may be specified in accordance with a defined semantic model and presentation model.

Animation sequences are built by applying processing templates of rules or instructions for each of the foregoing cases. There may be a processing template for each classification or type of mapping as described above. The mappings are ordered in accordance with the specified animation sequence type. For each mapping, a type or classification is determined. The type may be used as an index into the processing templates to obtain one or more rules which are performed for the type of a current mapping. In this manner, the sets of rules as defined in the processing templates are performed in different orderings in accordance with the ordering of the mappings for the currently selected kind of animation.

It should also be noted that additional processing instructions or rules are set forth for handling connectors. As known to those skilled in the art, connectors, which may also be referred to as transitions, are those elements in a diagram which are used in graphically representing a connection between other elements or objects in the diagram. For example, a life cycle diagram or flowchart may include connectors between elements. The rules for adding connectors to animation sequences are described below. It should be noted that the rules for processing connectors when building animation sequences may also be included in the processing templates component and retrieved as needed for processing connectors.

What will now be described are the processing templates of rules for each of the four mapping classifications and connectors.

In one embodiment, the display process 84 may determine which objects to include in an animation sequence and the order of animation sequences in accordance with the selected kind of animation (e.g., by level at once, etc.). The animation sequences may all be produced in a similar automated fashion by applying rules for the above mapping classifications.

For the 1 to 1 mapping, the object associated with a semantic element, and any appropriate connector(s), are included in the same animation sequence.

For the 1 to many mapping, there are multiple presentation elements that are associated with a semantic element. All presentation elements associated with a semantic element, and any appropriate connector(s), are associated in a same animation sequence.

For the many to 1 mapping, the first semantic element that maps to a presentation element, and any appropriate connector(s), are associated with an animation sequence. Subsequently, each remaining semantic element for the mapping is associated with the presentation element in a same animation sequence. For a given animation sequence including a presentation element, if the presentation is already displayed (i.e., was included in a previous animation sequence), the presentation element in the given animation sequence is ignored.

For the 0 to many mapping, all presentation elements are included in a single animation sequence. In one embodiment, these elements are always included first in an animation prior to processing any other mappings.

Connectors are added to animation sequences and/or used in creating new animation sequences using the following rules:

The first animated semantic element does not have any connectors associated with its animation sequence.

The second and subsequent semantic elements add the transitions or connectors occurring "before" them in their associated animation sequences. For example, in a process diagram, the sequence including node #2 adds the connector and any sibling transitions between node #1 and node #2 as part of the sequence including node #2.

The way in which it is determined if a transition is added to an animation sequence is by determining if the transition has a presentation element associated with it. As known in the art, a transition may be characterized as a display effect produced as a presentation progresses from one item to the next. A user may add transitions, for example, in connection with customizations.

As will be appreciated by those skilled in the art in connection with particular types of diagrams, special rules may be included for processing connectors therein. For example, an embodiment including cycle diagrams may perform processing to ensure that a connector connecting the last shape (i.e., object) with the first shape is shown with the last shape. Additional rules such as the foregoing may be included so that the display of a diagram includes the connector in an animation sequence associated with the latter object.

In connection with reverse ordering, the rules for the different mapping classifications or types may be applied in a reverse order. When a reverse ordering is applied, the rules regarding the placement of connectors into animation sequences differs as follows:

The first semantic element at the highest level does not have any connectors associated with its animation sequence.

All other semantic elements add the connectors "after" them to their animation sequences. For example, in a process diagram, node #2 may add the sibling transition and connector between node 2 and node 3. Recall that in reverse ordering, node 3 is displayed prior to node 2.

As in the case above, for reverse ordering, the way in which it is determined if a transition is added to an animation sequence is by checking if the transition has a presentation element associated with it.

In connection with certain diagrams that may be included in an embodiment with reverse ordering, processing may be performed to ensure that connectors are appropriated displayed. For example, processing steps may be performed to ensure that a cycle diagram is animated properly by having the connector that connects the last shape with the first shape shown with the first shape in the data model (i.e. the last shape shown). Other diagrams that may be included in an embodiment may have similar rules for use in connection with animation processing.

In one embodiment, connectors may be included in an animation sequence as an object or shape. An embodiment may also include functionality for customizing a connector as with other shapes. Similarly a user can customize the effect as well as the timing applied to the connector. Accordingly, an embodiment may handle customization of connectors in a manner similar to applying customization options to other objects in an animation sequence.

In one embodiment, connectors may be added as their own animation sequence to "start after previous" before their respective semantic element according to the rules outlined above. In one embodiment, each connector may transition in with a separate "start on click" as the trigger event for the next animation sequence. As known in the art, a trigger event may be characterized as an event signaling to start the next animation, such as, for example, a mouse click. An embodiment may also add connectors to the front of an animation sequence for their respective semantic element according to the rules outlined above.

The foregoing rules for connectors and mapping classifications may be included in processing templates 77.

In one embodiment, the animation that is displayed to a user may be created by grouping all animation sequences into a list of animations that transition by "start on click" (e.g., referring to a "mouse click", keyboard return, etc.) acting as the trigger event for transitioning to, and thus displaying, the next animation sequence. The animations are created by making lists of objects or "shapelists" for each animation sequence. Each shapelist contains the list of objects or shapes for each animation sequence.

What will now be described is how the animation sequences are formed for each of the different types or kinds of animation sequences as described for the embodiment's types identified herein. The formation of the animation sequences includes traversing the semantic elements in an order in accordance with the selected type of animation sequence (e.g., "in order", etc.). For each of the ordered SEL-PEL mappings, the rules obtained from the processing template for the mapping type or classification are applied. One or more semantic elements are associated with each animation sequence in accordance with the selected animation sequence type. Following are examples of processing steps that may be performed in an embodiment in connection with creating an animation for each of the different animation sequence types. These animations may include one or more animation sequences formed by applying the rules from the processing template in accordance with the different mapping types as described above.

As one object

The animation is applied to an anchor. Animation applied to an "anchor" means applying the animation to the diagram treating the elements therein as a single object or image.
This is the default selection after a user applies an effect to a diagram.

All at once

If there are PELs without SELs Animate all PELs without SELs
For [all elements in semantic model]{
    Create animation sequence
    Set to "start with previous" for the shapes in the animation sequence
}
Pass all animation sequences as shapelists to animate interface In order (one by one)

If there are PELs without SELs Animate all PELs without SELs
Set flag tto not reverse
For [all elements in order of semantic model]{
    Create animation sequence for semantic element
    Set to "start on click" for animation sequence
}

In reverse order (one by one)

Set flag to reverse
For [all elements in order of semantic model]{
    Create animation sequence for semantic element
    Set to "start on click" for animation sequence
}
For [all animation sequences created]{
    Reverse order of animation sequences
}
If there are PELs without SELs Animate all PELs without SELs By level one by one If there are PELs without SELs Animate all PELs without SELs
Set flag to not reverse
For [all levels]
    For [all elements at one lebel]{
        Create animations sequence for each semantic element at this level
        Set "start on click" for each animation sequence
    }

By Level one by one in reverse order

Set flag to reverse
For [all levels]
    For [all elements at one level]{
        Create animation sequence for each semantic element at this level
        Set "start on click" for each animation sequence
    }
For [all animation sequences created]
    Reverse order of animation sequences
If there are PELs without SELs Animate all PELs wwithout SELs By Level at once If there are PELs wwitjout SELs Animate all PELs without SELs
Set flag to not reverse
For [all levels]{
    Create animation sequence for all semantic elements at this level
    Set "start on click" for each animation sequence
}

By Level at once in reverse order

Set flag to reverse
For [all levels]{
    Create animation sequence for all semantic elements at this level
    Set "start on click" for each animation sequence
}
For [all animation sequences created]
    Reverse order of animation sequences
If there are PELs without SELs Animate all PELs without SELs Below is another alternative representation of how animation sequences may be generally formed in accordance with the different mapping types described above. Set out below, reverse order and in order are specified as general options:

Add one animation step for each PEL
In order: each step is added on the tail of a list of steps
In reverse order: each step is added on the head of the list of steps.
For those types for which a click step is added for an SEL (e.g., one by one/level one by one or level at once), the click step is for the first PEL added for this SEL (can be a connector). Each other PEL added for this SEL will be a "With previous" step causing the element to be animated with the previous click.

Semantic order for each SEL:
In order:
Animate connector to parent SEL
Animate SEL shapes
If needed: animate children SEL
Animate connector to next SEL
In Reverse order:
Children SELs are animated first
Animate connector to next SEL
Animate all connectors to children SELs
Animate SEL shapes
Add all non-animated shapes on the head of the list.

It should be noted that the foregoing utilizes a concept of a parent SEL and child SEL which refer to the hierarchical relationship between semantic elements of the semantic model at various levels.

Additionally, as part of processing described herein when forming animation sequences, the connectors are then processed for each of the above-referenced animation sequence type selections and animation sequences accordingly created and/or modified. The foregoing processing steps may also be characterized as templates of processing steps for each of the different supported animation sequence types. As such, these templates may also be stored in an embodiment alone, or in the same data container with, the other foregoing processing templates of rules for the different connectors and SEL-PEL mappings.

Figure 4A:
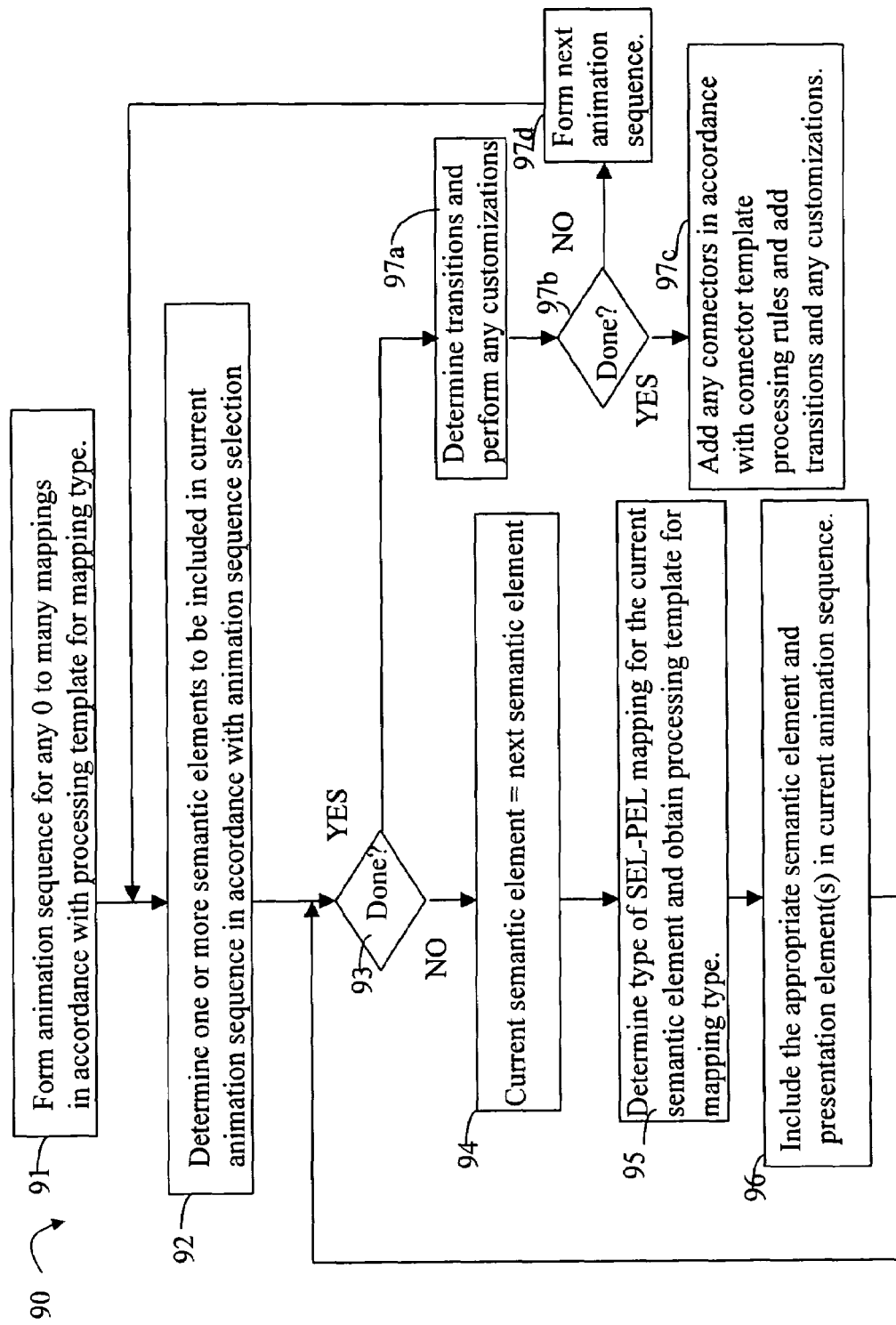
FIG. 4A is a flowchart of processing steps that may be performed in an embodiment in connection with forming animation sequences utilizing the techniques described herein.

Referring now to FIG. 4A, shown is a flowchart of processing steps that may be performed in an embodiment in connection with forming animation sequences in connection with the techniques described herein. The steps of flowchart 90 summarize processing as set forth above. At step 91, and animation sequence is formed for any 0 to many mappings. Step 91, and other processing steps of flowchart 90, form animation sequences in accordance with the processing template for particular SEL-PEL mapping types as described above. Control proceeds to step 92, where one or more semantic elements are determined. These one or more semantic elements determined at step 92 are determined in accordance with the current animation sequence selection such as, for example, "by level at once", and the like, as described elsewhere herein in more detail. An animation sequence is formed in subsequent processing steps of flowchart 90 using the semantic elements determined at step 92. At step 93, a determination is made as to whether processing of all semantic elements for the current animation sequence is complete. If not, control proceeds to step 94 where the current semantic element is assigned to be the next semantic element determined at step 92 for the current animation sequence being formed. At step 95, the type associated with the current SEL-PEL mapping for the current semantic element is determined, and the processing template for that mapping type is obtained. At step 96, the current semantic element along with appropriate presentation elements are added to the current animation sequence in accordance with the processing template obtained at step 95. Control then proceeds to step 93 to continue processing with the next semantic element for the current animation sequence.

If step 93 evaluates to yes indicating that processing of the semantic elements for the current animation sequence is complete, control proceeds to step 97a. At step 97a, transitions are inserted into the current animation sequence and any customizations may be performed for the current animation sequence. At step 97b, a determination is made as to whether all semantic elements included in the current semantic model have been processed. If so, control proceeds to step 97c where any connectors are processed in accordance with connector template processing rules. Additionally, as part of step 97c processing, any transitions and customizations are added in accordance with the connectors used in forming any new animation sequences and/or modifying existing animation sequences. If step 97b evaluates to no, control proceeds to step 97d to begin processing in forming the next animation sequence by proceeding to step 92 to determine the next set of one or more semantic elements to be processed in accordance with the current animation sequence selection type.

It should be noted that FIG. 4A summarizes general processing of semantic elements used in forming one or more animation sequences in accordance with the particular current animation sequence selection type. The specific steps used in forming each animation sequence in accordance with the current animation sequence selection type are set forth above for the particular types included in one embodiment set forth above. The specific steps utilize rules included in processing templates for each of the different types of SEL-PEL mappings as also described herein.

As will be appreciated by those skilled in the art, some of the steps of flowchart 90 of FIG. 4A may be performed in a different order than as set forth above. For example, an embodiment may also choose to perform processing for customization and/or connectors associated with a particular semantic element as the semantic element is processed. Alternatively, an embodiment may also perform all customization processing collectively as a single step. These and other variations will be appreciated by those skilled in the art utilizing the techniques described herein.

An embodiment may include functionality for animations to be customized. In other words, a user can modify the one or more animation sequences produced using the automated techniques described herein. The particular customizations included may vary with each embodiment and/or diagram. As an example, in one embodiment via the customization process, a user can change the effect on each individual shape, timing, how an animation is triggered, and the like.

In one embodiment, each object or shape in a diagram is associated with a unique identifier or ID by which that particular object in the diagram is identified in connection with animation processing. When a user adds or removes shapes, or changes diagrams, that particular shape ID, and any associated customization, are maintained if possible. If a user changes the shape of a diagram, the process displaying the animation performs processing to ensure that any updates are appropriately made.

In one embodiment, a user may switch diagrams and processing may be performed using the techniques described herein to maintain the customization to shapes, if possible. For example, a user may switch from a first diagram to a second diagram. Analysis may be performed on the second diagram's objects or shapes to determine the SEL-PEL mappings in accordance with the second diagram. If a semantic element maps to a presentation element having a same shape or object as in the first diagram, the specified customizations from the first diagram may be maintained and used in connection with animation of the second diagram. If the previously specified customizations cannot be maintained, regeneration of the appropriate animation sequence(s) is performed using the animation sequence type as selected by the user. If a shape is inserted or removed, the associated animation sequence, or portion thereof, for that shape may be accordingly updated.

It should be noted that cutting, copying, and/or pasting operations may be allowed in an embodiment and processing associated with these operations may be specified. In one embodiment, when a shape is copied, all animation knowledge may be stripped. When a shape is pasted into a diagram, the same processing as specified above for inserting a shape may apply, and all existing animation from a previous context (e.g., previous diagram) may be stripped.

An embodiment may include one or more different diagrams. An embodiment may specify which animation sequence types are supported for each diagram as part of the user interface. On a diagram switch, if a diagram is using an animation sequence type that the diagram a user switches to does not support, a mapping may performed to map an unsupported type to another type supported for use with the new diagram. For example, in one embodiment, a subset of the foregoing animation sequence types (e.g., as one, all at once, in order, in reverse order) may be supported for use with all diagrams. An embodiment may specify a mapping to one or more of these types in the subset so that when the user switches from a first diagram to a second diagram which does not support a previous type from the first diagram, one of those types included in the foregoing subset is used. Also, as noted elsewhere herein, when a user switches to a new diagram, an embodiment may maintain one or more options from the context of the previous diagram. These options maintained may include maintaining the content data, customizations, and animation sequence type from the previous diagram.

What will now be described are examples illustrating different types of animation in connection with a set of content data, and one or more diagrams or layouts.

Referring now to FIG. 5, shown is an example 100 of a bulleted list as may be included in a Microsoft PowerPoint™ presentation. The example 100 includes 10 semantic elements (SELs) so numbered from the first element in the list (ANALYZE MARKET DATA) to the last or tenth element (SHIP!). It should be noted that a semantic model may include varying numbers of elements and/or levels different from that illustrated in FIG. 5 with a single level. For example, although subsequent figures will utilize the example illustrated in FIG. 5, a semantic model may be specified having multiple levels in the form of a bulleted list such as:

Analyze Market Data
Research
Corroborate
Write specifications
Design
Refine
Implement
M1
M2
Ship!

Figure 6:
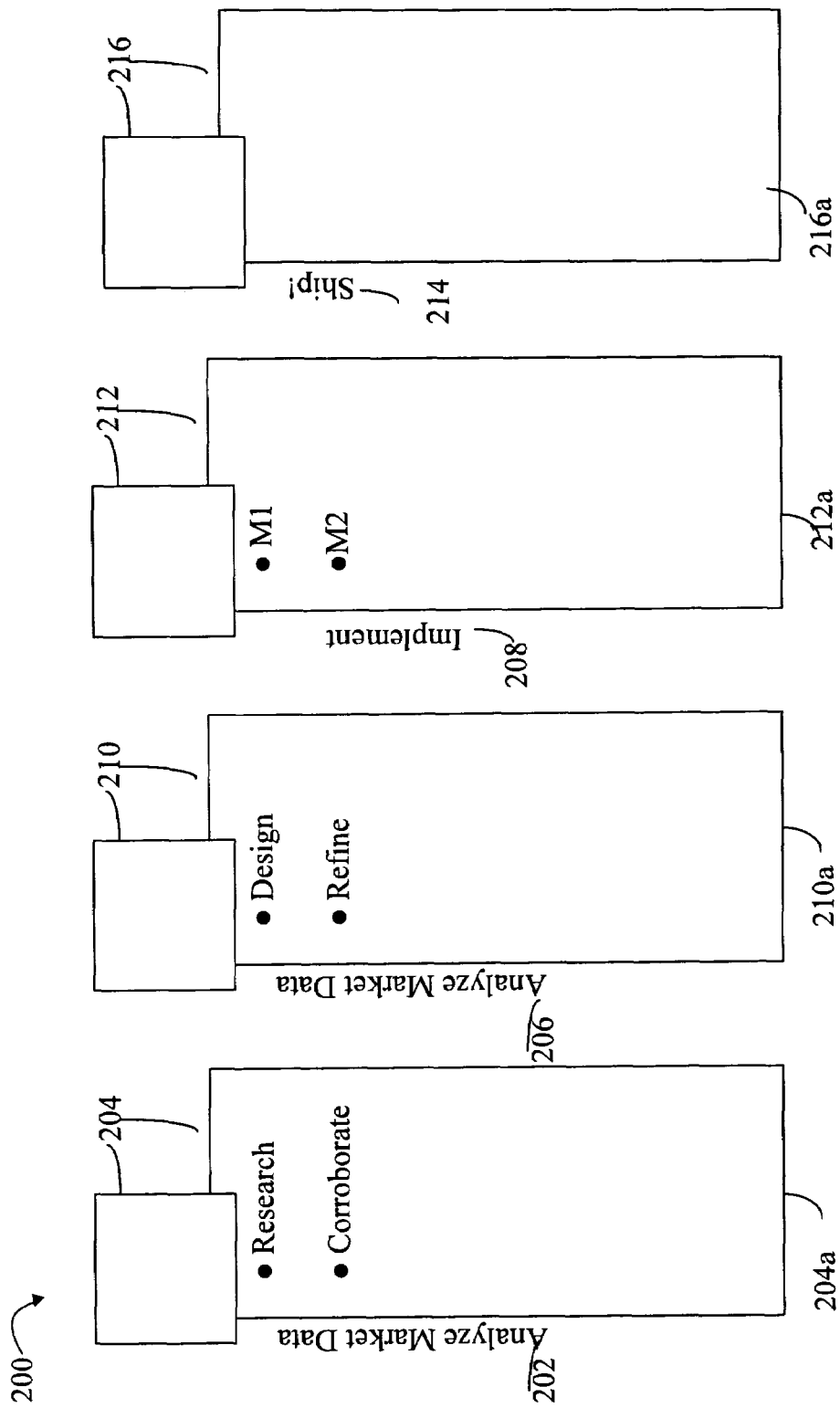
FIGS. 6-8 are examples of diagrams that may be animated using the techniques described herein including content data as illustrated in FIG. 5.

In FIG. 6, shown is a selected diagram incorporating the content data of the example 100. The selected diagram 200 may be animated using one of the foregoing predefined animation sequences as described elsewhere herein. Selection of one of the animation sequences affects how and when the content data and the objects are displayed. In other words, the selected animation sequence causes a set of rules to be followed in accordance with the SEL-PEL mappings using the techniques described herein to display the content data and objects in the diagram. In this example, SEL 1 202 may map to 2 PELS as denoted by 204. SEL 2 maps to the PEL for 204a. SEL3 also maps to the PEL for 204a. A user may specify a first animation sequence type of "by level one by one". As such, for a first animation step, 202 and the objects of 204 may be displayed. It should be noted that at this point, element 204a is not displayed with the text RESEARCH and CORROBORATE but rather appears as an empty box. When a trigger event occurs, such as a mouse click, causing the next animation step to occur, element 206 and 210 may be displayed. Note that element 210a also appears as an empty box as just described for element 204a. Animation step 3 occurs with the next event trigger to display 208 and elements for 212. Note that 212a appears as an empty box at this point. Animation step 4 occurs with the next event trigger to display 214 and 216 elements. Animation step 5 occurs with the next event trigger resulting in the text RESEARCH being displayed in 204a. Animation step 6 occurs with the next trigger event resulting in DESIGN being displayed in 206a. Animation step 7 occurs with the next trigger event resulting in M1 being displayed in 208a. Animation step 8 occurs with the next trigger event resulting in CORROBORATE being displayed in 204a. Subsequently, animation steps 8 and 9, respectively, result in display of REFINE and M2 in the shapes or objects as illustrated in the example 200. The animation sequences resulting in display of the foregoing animation may be produced using the rules for the SEL-PEL mapping types processed in a particular order in accordance with the processing steps also described above for the animation sequence selection type of "by level one by one".

If the animation sequence type selected is then changed to "by level at once", animation step 1 results in simultaneous display of elements 202, 204, 206, 208, 210, 212, 214 and 216 in which the boxes denoted by 204a, 210a and 212a appear empty without additional text. Animation step 2 results in display of RESEARCH, DESIGN and M1 as illustrated. Animation step 3 results in display of the remaining text portions as illustrated. Using the foregoing techniques, the same SEL-PEL mappings may be utilized but are traversed in a different order for forming different animation sequences with respect to the previous ordering for the previous animation selection of "by level one by one".

Figure 7:
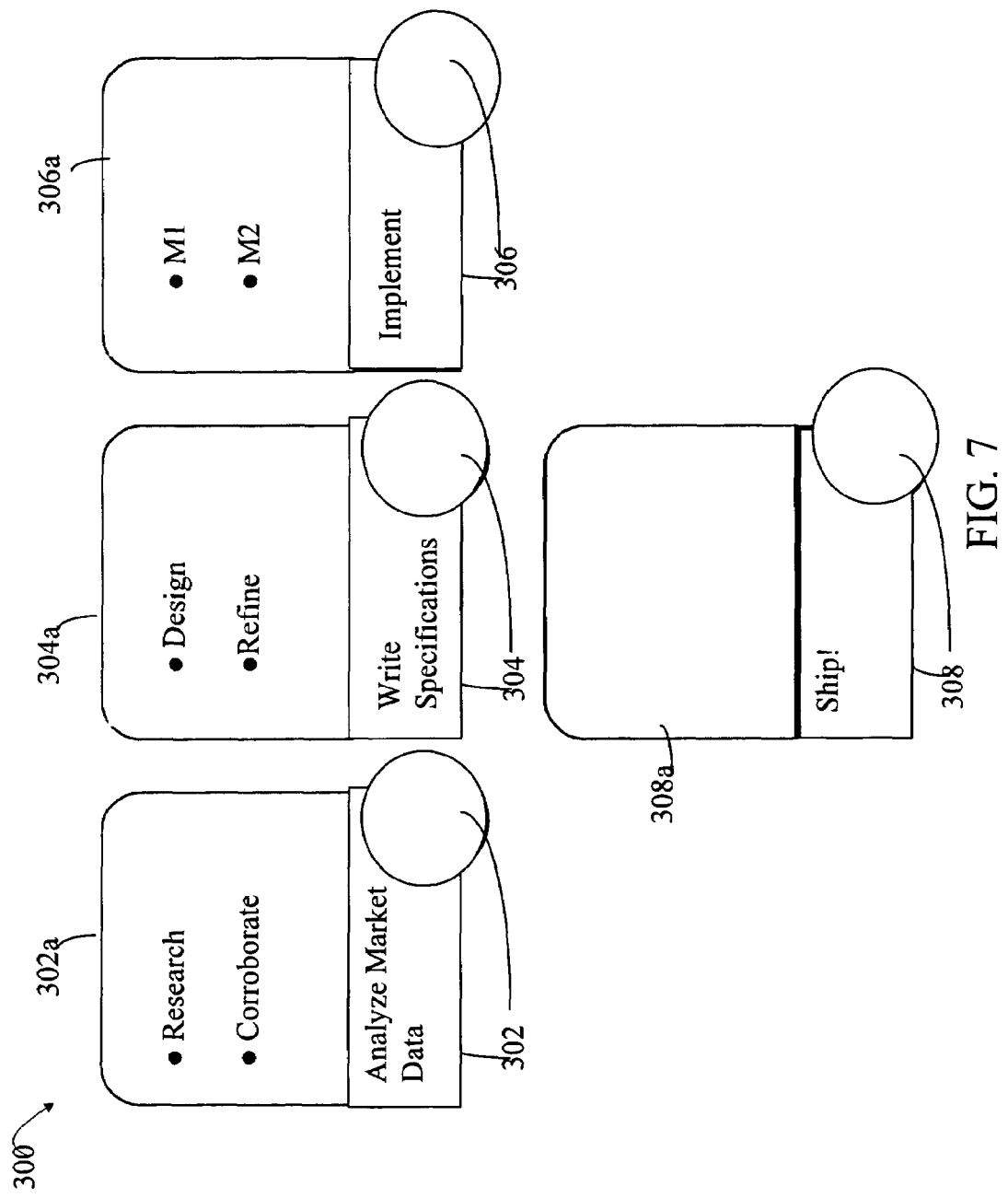

A user may switch diagrams, for example, to a diagram as illustrated in FIG. 7. The selection of a new diagram using the same content data may result in display 300. The example 300 represents a different way of graphically representing the same content data from 100. In this example 300, the content data is maintained when the diagram switch is performed. Analysis is performed so that the appropriate SEL-PEL mappings are generated. In the diagram of FIG. 7, the SEL for ANALYZE MARKET DATA may be mapped to 2 PELs 302, the SEL for WRITE SPECIFICATION may be mapped to 2 PELs 304. The SEL for IMPLEMENT may be mapped to 2 PELs 306 and the SEL for SHIP! may be mapped to the 2 PELs 308. The SEL for RESEARCH may be mapped to the single PEL 302a. Similarly, other SELs are mapped to one or more PELs in accordance with the diagram of 300. These SEL-PEL mappings may be generated automatically using the techniques described herein. The current animation sequence selection from the previous example of 200 may be maintained and an animation sequence may be automatically generated also using the techniques described herein in accordance with the SEL-PEL mappings for the currently selected animation sequence type (e.g., "by level at once").

Figure 8:
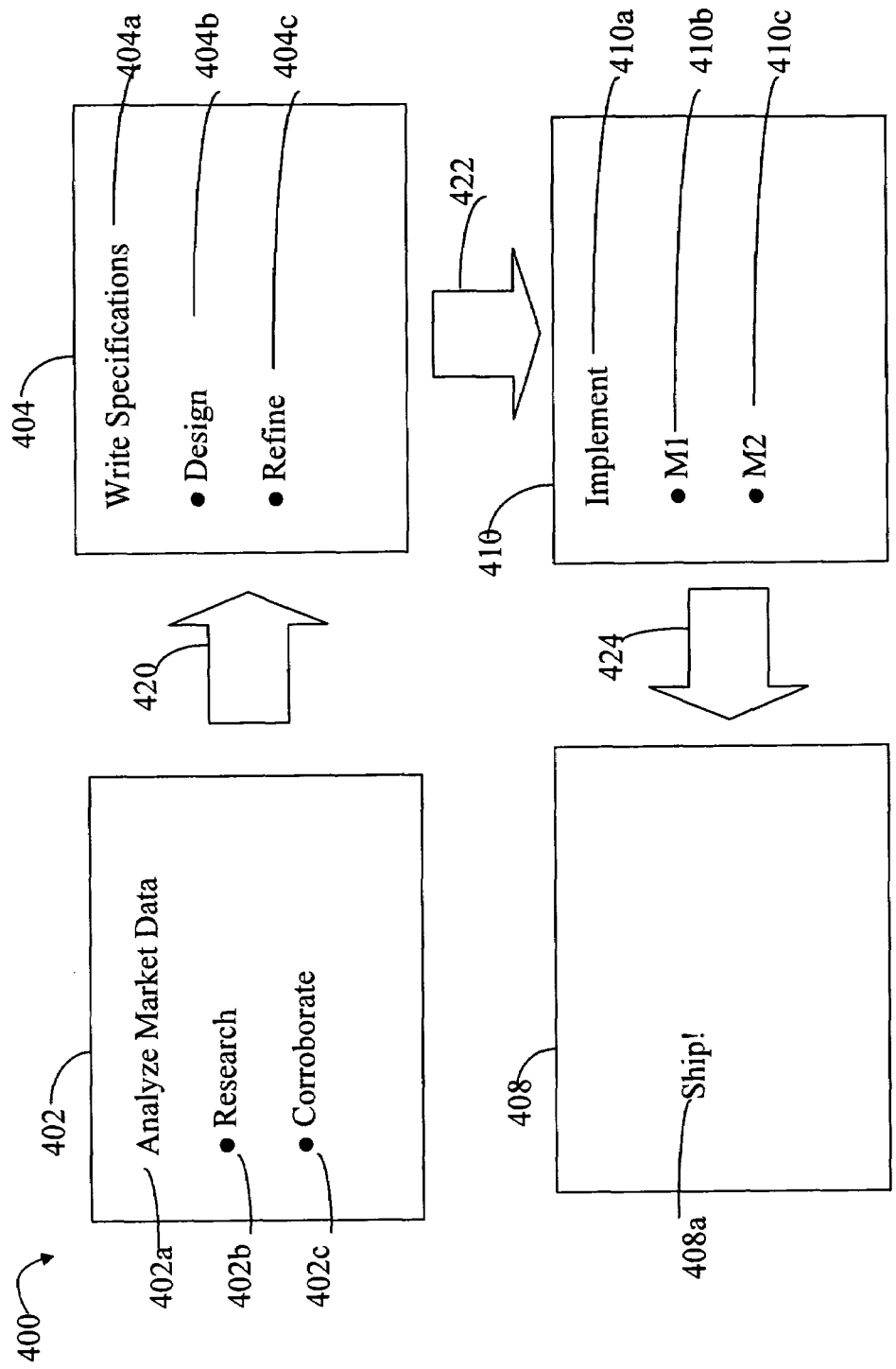

Referring now to FIG. 8, shown is yet another diagram for graphically displaying the same set of content data from the example 100. A user may, for example, switch to a new diagram from the previously selected diagram of FIG. 7. In the example 400 of FIG. 8, new SEL-PEL mappings are generated automatically. In this example, each of the SELs for ANALYZE MARKET DATA, RESEARCH and CORROBORATE are mapped to the PEL for 402. There are three separate SEL-PEL mappings for these. Similarly, mappings are regenerated for the remaining SELs and PELs. In this example, connectors 420, 422 and 424 are also illustrated and the above-referenced processing rules for connectors are applied in connection with generating animation sequences for the connectors.

Figure 9:
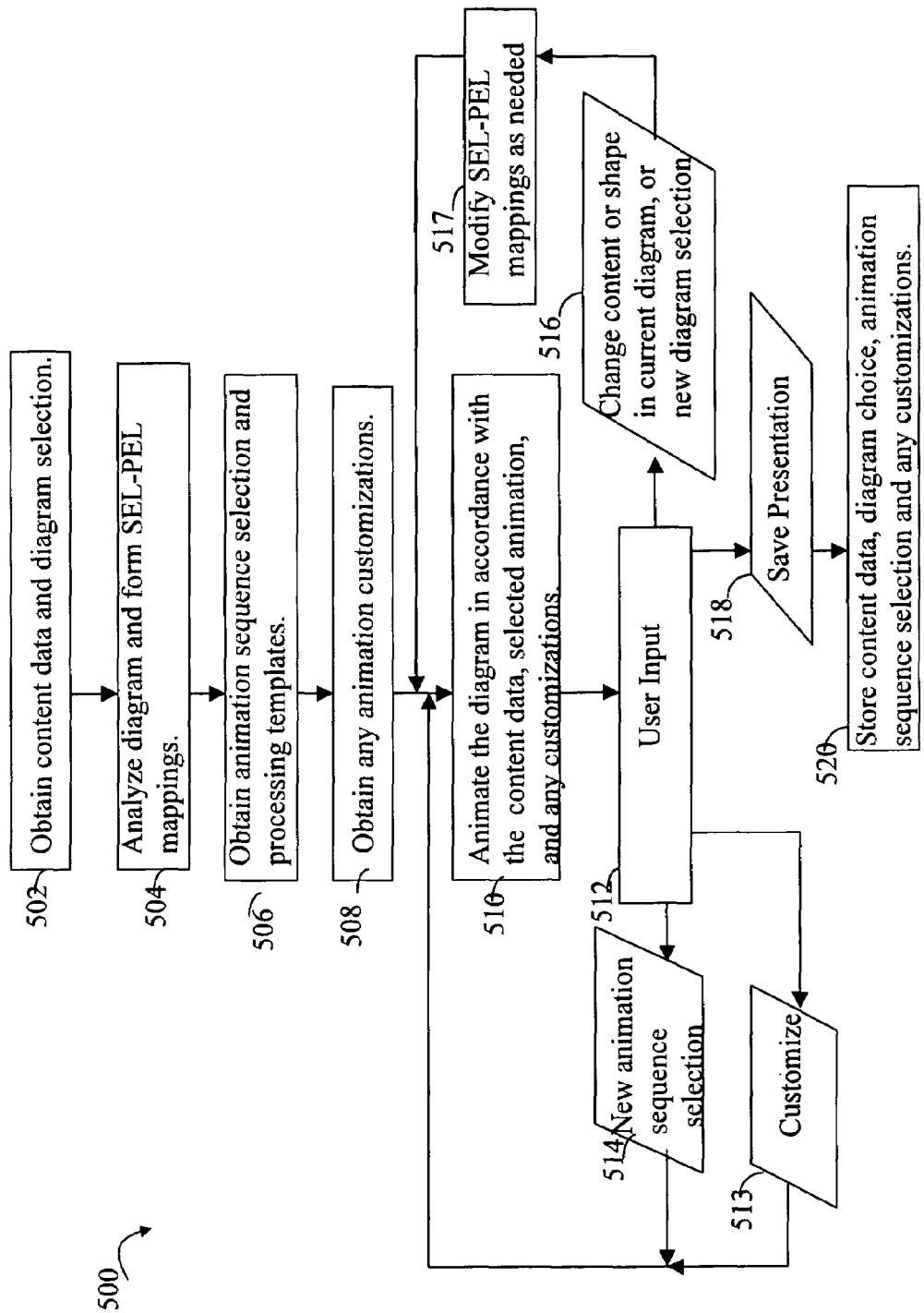
FIG. 9 is a flowchart of processing steps that may be performed in an embodiment in connection with animating a diagram in accordance with user input.

Referring now to FIG. 9, shown is a flowchart of processing steps that may be performed in an embodiment in connection with animating a diagram in accordance with user input utilizing the techniques described herein. The processing steps of 500 summarize the overall processing described herein as may be performed in response to a selected set of user inputs. At step 502, the content data and diagram selection may be obtained. At step 504, the diagram may be analyzed to form the SEL-PEL mappings. At step 506, the animation sequence selection and processing templates may be obtained for the SEL-PEL mappings from step 504. At step 508, any animation customizations specified may be obtained. At step 510, the diagram selected is animated in accordance with the content data, selected animation sequence selection, and any customizations. It should be noted that step 510 includes generation of any animation sequences necessary to animate the selected diagram. Step 510 processing also includes selection by the user to animate the selected diagram as may be performed as a result of selecting an option from a user interface such as, for example, selection of an option to view a particular slide or presentation. At step 512, the currently displayed interface, such as a graphical user interface, may wait for the next user input to be obtained. The flowchart 500 illustrates what may be performed in response to a particular subset of user input as related to the techniques described herein. A user may input a new animation sequence selection 514. Subsequent requests to animate the diagram result in processing at step 510 using the new animation sequence selection. The user may input one or more customizations 513 which may be incorporated into the diagram. Subsequent requests to animate the diagram result in processing at step 510 using the new customizations. The user may make a change to contents or shape of the current diagram or make a new diagram selection 516. Control then proceeds to step 517 to modify the SEL-PEL mappings as needed. Additionally, although not specifically set forth in the flowchart 500, processing of step 517 may also include determining a different animation sequence type selection, for example, if a new diagram is selected and the currently selected animation sequent type is not supported for use with the newly selected diagram. An embodiment may also perform processing associated with customizations to ensure that the customizations currently specified may be reused in connection with the newly selected, or otherwise modified, diagram. Subsequent requests to animate the diagram results in processing at step 510 in accordance with steps 516 and 517 processing. The user may also select an option at step 518 to save the presentation. Control then proceeds to step 520 to store the content data, current diagram choice, current animation sequence selection, and any customizations. An embodiment may, for example, save the diagram as part of the presentation. The option to save a presentation may be performed, for example, by a user explicitly selecting a menu option to save the presentation, or may also perform the processing of step 520 as a result of choosing to exit the currently executing application program. In the event that the user explicitly selects an option to save the current presentation, processing from step 520 may continue with other processing steps not currently illustrated in FIG. 9.

It should be noted that an embodiment may also include other variations of the foregoing, as well as provide for processing of additional types of user input as will be appreciated by those skilled in the art.

What will now be described are various screenshots as may be using connection with an embodiment utilizing the techniques described herein in connection with automated animation of the diagram.

Figure 10:
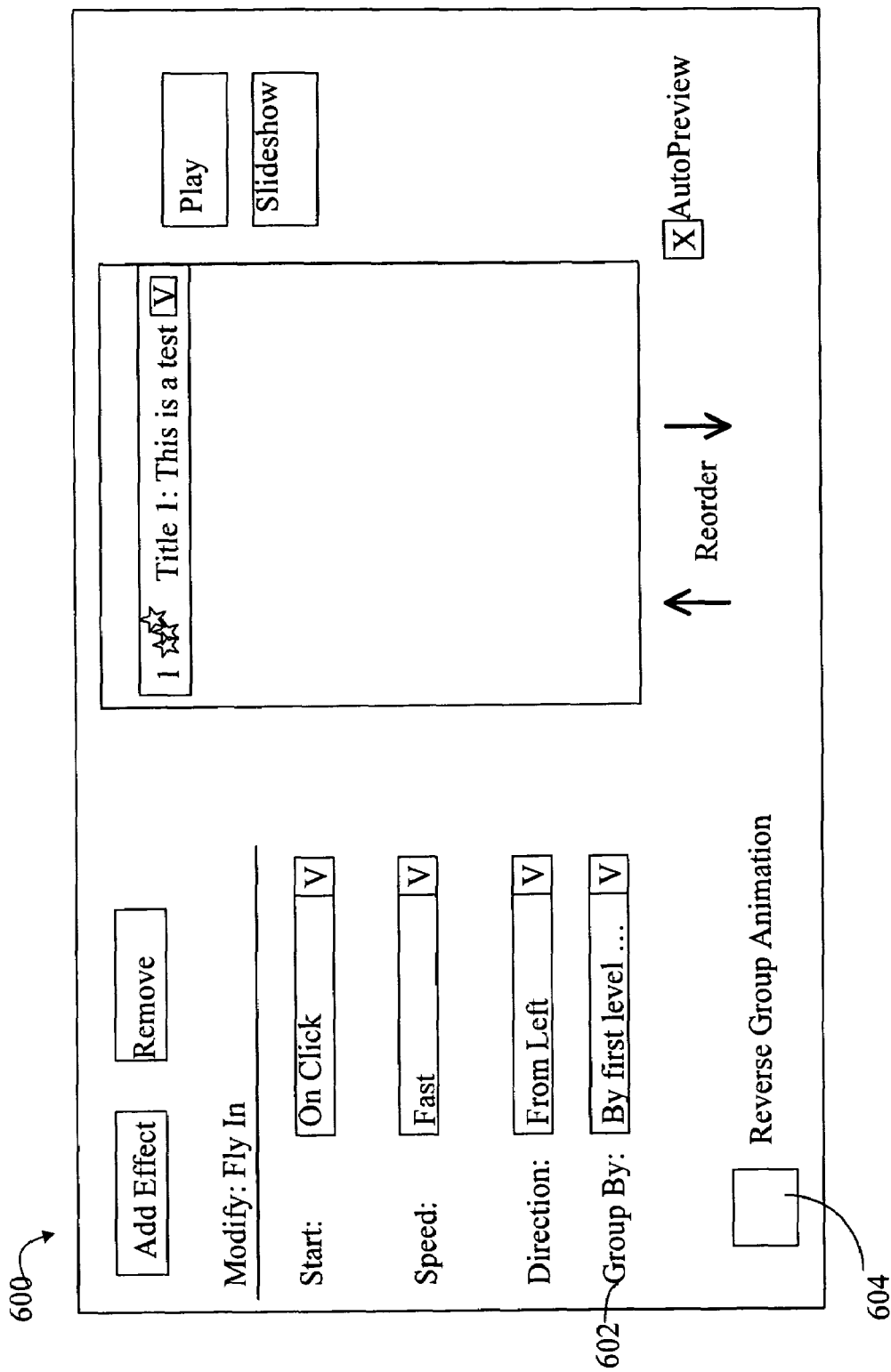
FIGS. 10-11 are examples of screenshots that may be displayed in an embodiment in connection with the techniques described herein.

Referring now to FIG. 10, shown is an example 600 of a screenshot that may be displayed by an embodiment utilizing the techniques described herein. In particular, the screenshot in the example 600 may include elements 602 and 604. Element 602 may be used in connection with the user selecting a particular animation sequence type indicating how a particular diagram will be animated. As described above, for example, an embodiment may include options such as "by level at once", "in order", and the like. In this example, an embodiment may support reverse ordering of animation sequences for those types indicated by element 602. In this example, reverse ordering may be indicated by checking element 604 resulting in reverse ordering of the selection indicated by element 602.

Figure 11:
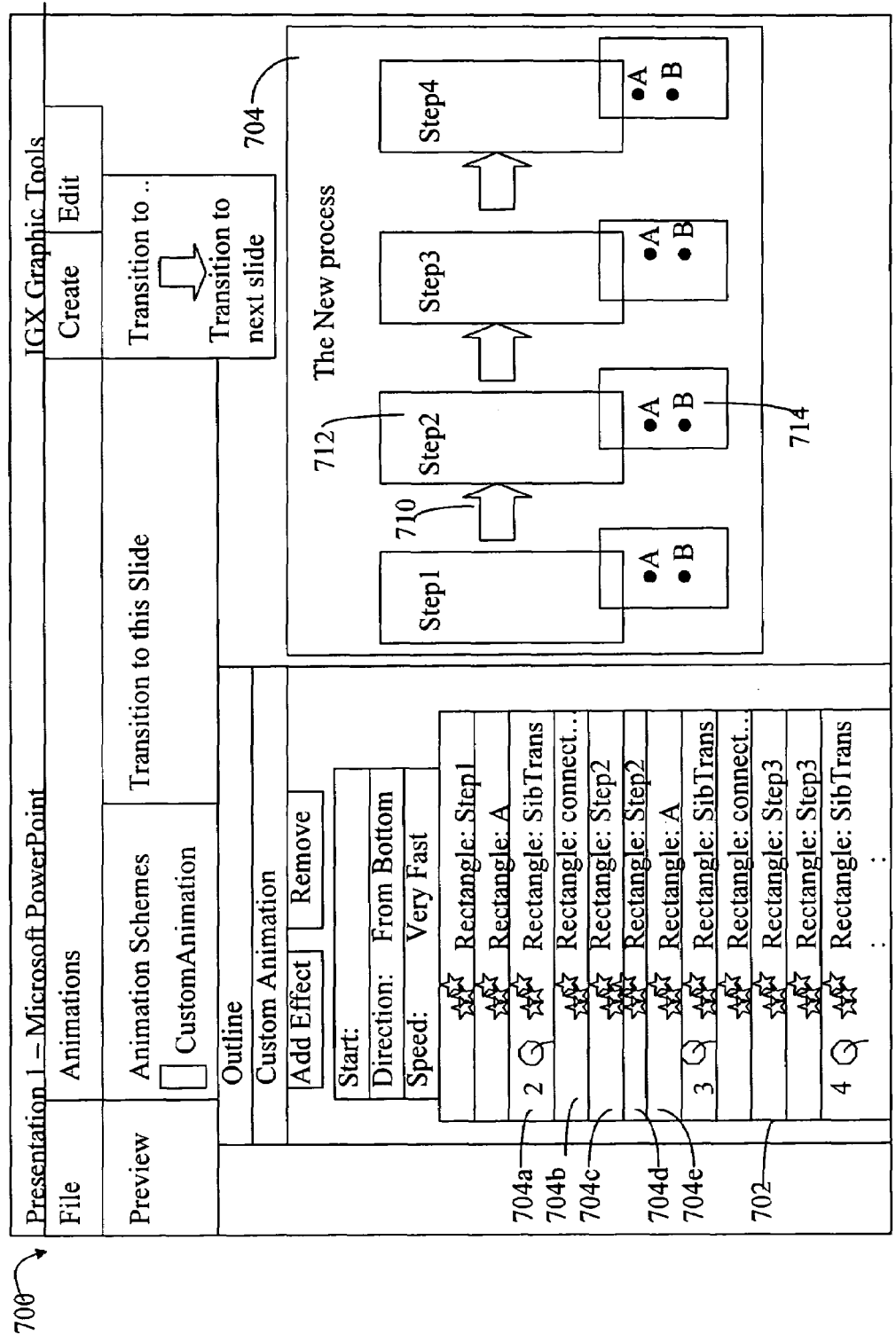

Referring now to FIG. 11, shown is in example 700 of a screenshot that may be displayed by an embodiment utilizing the techniques described herein. The example 700 illustrates the generated animation sequences in connection with a selected diagram. In the example 700, a resulting animated diagram may be included in portion 704. The element 704 may include the diagram as a result of executing the steps for animation as outlined in 702. Element 702 in this example is a custom animation pane by which a user may modify a generated set of animation sequences for animating a particular diagram. The generated set of animation sequences may be automatically produced using the techniques described herein. Subsequently, in an embodiment supporting customizations, a user may view the generated steps for animating a particular diagram and may accordingly modify these as part of a customization process. In this example, element 704a may be characterized as beginning a second animation step resulting in display of element 712 including the text there in "STEP 2", and element 714 including only the text "A".

It should be noted that the foregoing screenshots of FIGS. 10 and 11 are examples that may be included in an embodiment. Other embodiments may utilize other screenshots and interfaces in connection with the techniques described herein.

It should also be noted that although the diagrams described herein may be included with an application program as part of a collection of predetermined diagrams or layouts, a user or other third party may also produce diagrams that may be used with an application program and the techniques described herein for animation. Although the techniques are described herein in connection with animating a diagram as may be included in a presentation, those skilled in the art will appreciate that the techniques described herein may also be used in connection with other items that may be characterized as graphics.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for forming one or more animation sequences used in animating a graphic comprising:
   receiving a semantic model of one or more semantic elements corresponding to content data;
   receiving a presentation model of one or more presentation elements corresponding to objects to be populated with said content data and displayed in a diagram presented by a computer;
   determining a set of one or more mappings for each of said semantic elements, said set of one or more mappings including a mapping of each of said semantic elements to one or more presentation elements, each of said one or more mappings classified based on different types of mapping relationships characterized by number of mappings between semantic elements and presentation elements;
   receiving a user-selected animation sequence type for grouping semantic elements to animate together as an animation sequence;
   ordering said set of one or more mappings in accordance with said selected animation sequence type, said selected animation sequence type specifying set of grouped semantic elements that animate together; and
   building one or more animation sequences by traversing said set of one or more mappings in accordance with said ordering, determining which semantic elements to include in a current animation sequence in accordance with said selected animation sequence type, determining a mapping classification associated with each semantic element to include in said current animation sequence, and applying one or more rules for building animation sequences in accordance with a particular mapping classification associated with each semantic element to include in said current animation sequence,
   wherein said set of one or more mappings is modified automatically in response to a change in a current diagram or selection of a different diagram and is traversed in accordance with a different ordering in response to a different selected animation sequence type.

2. The method of claim 1, wherein said one or more rules are included in processing templates, said processing templates including a predetermined set of one or more rules associated with each mapping classification.

3. The method of claim 1, wherein said traversing step is included in a predefined set of one or more processing steps defined for use with the particular selected animation sequence type, said one or more processing steps for said selected animation sequence type specifying how to group objects in said one or more animation sequences.

4. The method of claim 1, wherein said set of one or more mappings includes a first mapping of a first semantic element to a first presentation element, and a second mapping of a second semantic element to the first presentation element.

5. The method of claim 1, wherein said set of one or more mappings includes a mapping of a presentation element to a plurality of presentation elements.

6. The method of claim 1, wherein said set of one or more mappings includes a mapping of many semantic elements mapping to a single presentation element.

7. The method of claim 1, wherein said set of one or more mappings includes a mapping specifying that no semantic elements are mapped to one or more presentation elements if said one or more presentation elements are background presentation elements.

8. The method of claim 1, wherein the method is used to animate one or more diagrams included in a collection of predefined diagrams for an application program which processes said one or more diagrams which are included in a presentation.

9. The method of claim 1, further comprising:
   applying one or more rules in connection with processing a connector included in said graphic.

10. The method of claim 1, further comprising:
    customizing at least a portion of said one or more animation sequences by specifying at least one customization.

11. The method of claim 10, further comprising:
    switching from a first diagram to a second diagram and animating said second diagram in accordance with said content data, said selected animation sequence type, and said at least one customization used in connection with said first diagram.

12. The method of claim 11, further comprising:
    automatically determining new mappings in accordance with said second diagram;
    determining if any currently specified customizations for said first diagram are not applicable for use with said second diagram; and
    determining if said selected animation sequence type used in connection with said first diagram is available for use with said second diagram.

13. The method of claim 1, further comprising:
    traversing said set of one or more mappings in said different ordering in accordance with said different selected animation sequence type; and
    rebuilding one or more animation sequences when performing said traversing for said different ordering using each of said one or more mappings by applying one or more rules in accordance with a particular classification associated with each of said one or more mappings, said different selected animation sequence type being used in determining how to group objects in said one or more animation sequences.

14. The method of claim 1, wherein said selected animation sequence type is selected from a set of one or more predefined types including at least one type specifying animation in accordance with one or more levels indicated by said semantic model.

15. The method of claim 1, wherein said method is used to animate one or more diagrams which are not included in a collection of predefined diagrams for an application program which processes said one or more diagrams.

16. A computer readable storage medium having computer executable instructions stored thereon that when executed cause a computer to perform steps for forming one or more animation sequences used in animating a graphic, the steps comprising:
    constructing a semantic model of one or more semantic elements corresponding to content data;
    constructing a presentation model of one or more presentation elements corresponding to objects to be populated with said content data and displayed in a diagram;
    determining a set of one or more mappings for each of said semantic elements, said set of one or more mappings including a mapping of each of said semantic elements to one or more presentation elements, each of said one or more mappings classified based on different types of mapping relationships characterized by number of mappings between semantic elements and presentation elements;

receiving a user-selected animation sequence type for grouping semantic elements to animate together as an animation sequence;

ordering said set of one or more mappings in accordance with said selected animation sequence type, said selected animation sequence type specifying a set of grouped semantic elements that animate together; and building one or more animation sequences by traversing said set of one or more mappings in accordance with said ordering, determining which semantic elements to include in a current animation sequence in accordance with said selected animation sequence type, determining a mapping classification associated with each semantic element to include in said current animation sequence, and applying one or more rules for building animation sequences in accordance with a particular mapping classification associated with each semantic element to include in said current animation sequence, wherein, in connection with animating said graphic after a different selected animation sequence type is specified, said one or more mappings are traversed in accordance with a different ordering and said same one or more rules are applied in accordance with the particular classification associated with each of said one or more mappings.

17. The computer readable storage medium of claim 16, wherein said traversing is included in a predefined set of one or more processing steps defined for use with the particular selected animation sequence type.

18. A computer-implemented method for forming one or more animation sequences used in animating a graphic comprising:

receiving a set of one or more mappings for semantic elements, said set of one or more mappings including a mapping of one or more semantic elements to one or more presentation elements, each of said one or more mappings classified based on different types of mapping relationships characterized by number of mappings between semantic elements and presentation elements, said one or more semantic elements being included in a semantic model of one or more semantic elements corresponding to content data, said one or more presentation elements being included in a presentation model of one or more presentation elements corresponding to objects to be populated with said content data and displayed in said graphic presented by a computer;

receiving a user-selected animation sequence type for grouping semantic elements to animate together as an animation sequence;

ordering said set of one or more mappings in accordance with said selected animation sequence type, said selected animation sequence type specifying a set of grouped semantic elements that animate together; and building one or more animation sequences by traversing said set of one or more mappings in accordance with said ordering, determining which semantic elements to include in a current animation sequence in accordance with said selected animation sequence type, determining a mapping classification associated with each semantic element to include in said current animation sequence, and applying one or more rules for building animation sequences in accordance with a particular mapping classification associated with each semantic element to include in said current animation sequence, wherein, in connection with animating said graphic after a different selected animation sequence type is specified, said one or more mappings are traversed in accordance with a different ordering and said same one or more rules are applied in accordance with the particular classification associated with each of said one or more mappings.

19. The method of claim 18, further comprising:

switching from a first diagram to a second diagram and animating said second diagram in accordance with said content data, said selected animation sequence type, and said at least one customization used in connection with said first diagram;

automatically determining new mappings in accordance with said second diagram;

determining if any currently specified customizations for said first diagram are not applicable for use with said second diagram; and determining if said selected animation sequence type used in connection with said first diagram is available for use with said second diagram.

20. The method of claim 18, further comprising:

dynamically displaying a user interface with one or more animation options, wherein said one or more animation options change in accordance with a currently selected diagram.

* * * * *

UNITED STATES PATENT AND TRADEMARK OFFICE
CERTIFICATE OF CORRECTION

PATENT NO.      : 7,737,996 B2                          Page 1 of 1
APPLICATION NO. : 11/291265
DATED           : June 15, 2010
INVENTOR(S)     : Lutz Gerhard et al.

It is certified that error appears in the above-identified patent and that said Letters Patent is hereby corrected as shown below:

In column 19, line 28, in Claim 1, after "specifying" insert -- a --.

Signed and Sealed this
Third Day of May, 2011

David J. Kappos
*Director of the United States Patent and Trademark Office*